Dec. 26, 1944. J. A. MAURER, JR  2,366,040
OPTICAL SYSTEM
Filed July 4, 1942  3 Sheets-Sheet 1
PRIOR ART Fig. 1
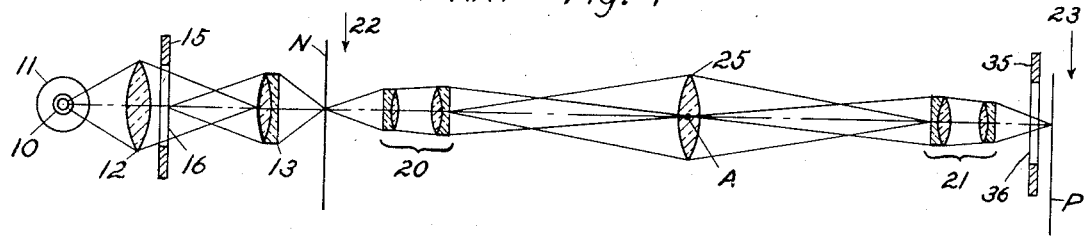
Fig. 2
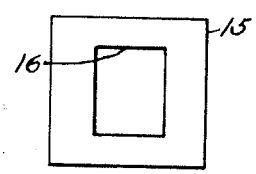
Fig. 3
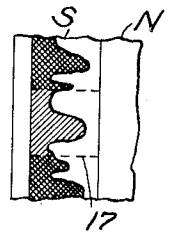
Fig. 4
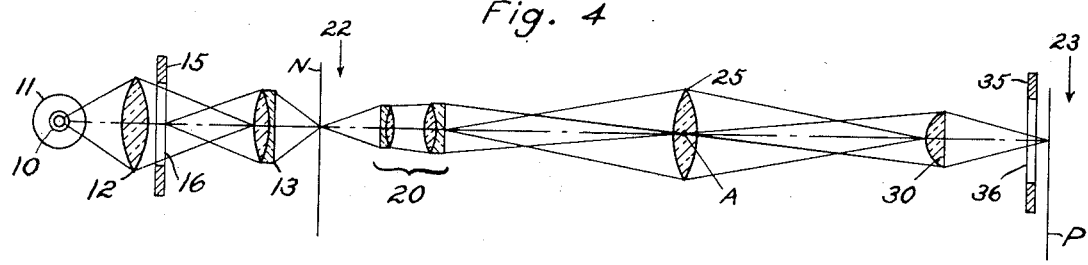
Fig. 5
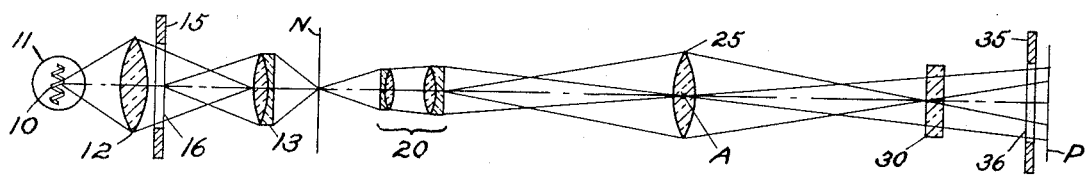
Fig. 6
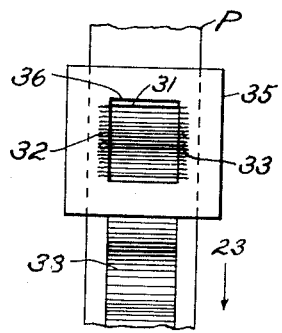
INVENTOR:
John A. Maurer, Jr.
BY Otto J. Nathanson
HIS AGENT Dec. 26, 1944.    J. A. MAURER, JR    2,366,040
OPTICAL SYSTEM
Filed July 4, 1942    3 Sheets-Sheet 3

INVENTOR:
John A. Maurer, Jr.
BY Otto J. Nathansohn
HIS AGENT

UNITED STATES PATENT OFFICE 2,366,040

OPTICAL SYSTEM

John A. Maurer, Jr., New York, N. Y., assignor to J. A. Maurer, Inc., New York, N. Y, a corporation of New York Application July 4, 1942, Serial No 449,797

2 Claims. (Cl. 88—24)

This invention relates to optical systems for optical sound track printers. More particularly, it relates to sound printing optical systems of the type in which the sound track printed thereby on the positive film is an erect image of the sound track on the negative film, that is, an image whose co-ordinate directions have an enantiomorphic relation to the co-ordinate directions of the object that is imaged. Such an erect image is customarily obtained by employing first imaging means, that is, a lens or a system of lenses or equivalent means, for forming at a point intermediate the negative and positive films an image of the sound track on the negative film, and second imaging means which image on the positive film the image formed at the intermediate point. The erection thus accomplished of the image on the positive film permits movement of the negative and positive films in the same direction downwards or upwards, as the case may be, and thereby a simplified mechanical construction of the sound printer and particularly its driving mechanism.

In the erect image sound printing optical systems known heretofore, the two above mentioned imaging means are made up either of only spherical lenses, or of only cylindrical lenses, or of a combination of spherical with cylindrical lenses. In optical systems in which either one of the last two types of imaging means is employed as either the first imaging means or the second imaging means or both, the actions of the various cylindrical, or cylindrical and spherical, lenses in the two co-ordinate planes add up in such a manner that the negative and positive films are at conjugate foci of the optical system in both planes. The actions of the two imaging means in the two co-ordinate planes thus co-operate in any one of the three cases so as to form an image on the positive film which is a replica of the sound track on the negative film as regards both the amount and the distribution of its illumination. When, therefore, the sound track on the negative film is of the variable area type the sound track produced on the positive film is also of the variable area type, and when the sound track on the negative film is of the variable density type the sound track produced on the positive film is also of the variable density type.

In present day practice, the choice between the two types of sound track is generally made in such a manner that where variable area sound track is chosen for recording it is also chosen for reproduction, and where variable density sound track is chosen for recording it is also chosen for reproduction, and for this manner of choosing the type of sound track the known sound printing optical ssytems are suitable enough. It has been found, however, that, with the refined methods of sound-on-film recording and reproduction now available, it is at times desirable to record sound by a method that will result in a variable area sound track but to reproduce the sound so recorded from a variable density sound track. To that end, the variable area sound track on the negative film must be converted into a variable density sound track on the positive film. This conversion is preferably effected during the printing operation, and preferably by optical means since the employment of mechanical or electrical means would easily introduce objectionable distortions and thus defeat the main purpose of the conversion, namely, the production of a sound record from which sound may be reproduced with particularly high fidelity.

One object of the invention, therefore, is to provide an erect image printing optical system by means of which a variable area sound track on the negative film may be converted into a variable density sound track on the positive film, the variable density sound track having otherwise the same characteristics as the variable area sound track.

Another object of the invention is the provision of such an optical system in which the conversion is effected solely by optical means.

Another object of the invention is the provision of such an optical system by which the conversion is effected in a particularly simple and efficient manner.

Another object of the invention is to provide an erect image optical system for the printing of variable density sound tracks which does not require the provision of cylindrical or other anamorphosers for efficient operation with different ratios of magnification in the two co-ordinate directions.

Still other objects and advantages of the invention include those which are hereinafter stated or apparent, or which are incidental to the invention.

The objects of the invention are substantially achieved by providing an erect image sound printing optical system in which at least one of the two above characterized imaging means acts in only the vertical plane and at the same time is the only imaging means having at its conjugate foci the particular object and place of imagery associated therewith. When, for example, the first imaging means is to act in only the vertical plane it is the only imaging means in the optical system having at its conjugate foci the sound track on the negative film and the intermediate point. When, on the other hand, the second imaging means is to act in only the vertical plane it is the only imaging means in the optical system having at its conjugate foci the intermediate point and the positive film. In either case, therefore, the negative and positive films are at conjugate foci of the optical system in only the vertical plane, while they are out of focus with respect to each other in the horizontal plane.

In the foregoing brief explanation of the state of the art and summary of the invention, and throughout the present specification, the term "co-ordinate planes" designates two planes at right angles to each other whose line of intersection is the optical axis of the system. The terms "plane of the negative film" and "plane of the positive film," respectively, designate the two planes at right angles to the optical axis, and hence to the two co-ordinate planes, through which the nagtive film and the positive film, respectively, move at the points where they are intersected by the optical axis. The direction in which the negative and positive films move through their respective planes, and directions parallel thereto, are called "vertical," and the direction on the two films which is at right angles to the vertical direction at the points of intersection by the optical axis, and the directions parallel thereto, are called "horizontal." The vertical and horizontal directions together are sometimes referred to as the "co-ordinate directions." Of the two co-ordinate planes, the plane which contains the optical axis and the horizontal directions is called the "horizontal plane," while the plane which is at right angles to the horizontal plane is called the "vertical plane."

Thus, in the present specification the terms "vertical" and "horizontal" are not used in any absolute sense but merely to distinguish between two planes, or two directions, at right angles to each other, and choice between these two terms has been determined merely by convenience in description and illustration.

Likewise, the terms "negative film" and "positive film" are used throughout this specification not as referring to any particular type of film stock, but the term "negative film" merely designates the film carrying the sound track from which a print is to be made, and the term "positive film" the film on which the print is made.

Finally, the term "variable area sound track" is used throughout this specification as including the two kinds of variable area sound track known in the art as unilateral and bilateral, or symmetrical, variable area tracks. It also includes any noiseless unilateral and bilateral variable area tracks, be they produced by the bias or by the shutter noiseless method.

The invention will be better understood when the following description is considered with the accompanying drawings of several presently preferred embodiments thereof, and its scope will be pointed out in the appended claims.

In the drawings:

Fig. 1 is a diagrammatic longitudinal section in the vertical plane of a conventional erect image sound printing optical system.

Fig. 2 is an elevation of an element shown in Fig. 1 and also in Figs. 4 and 5 and Figs. 7 to 14.

Fig. 3 is an enlarged elevation of the negative film showing the uniformly illuminated light spot which is formed in the plane thereof in the optical system of Fig. 1 and also in the optical systems of Figs. 4 and 5 and Figs. 7 to 10.

Fig. 4 is a diagrammatic longitudinal section in the vertical plane of an erect image sound printing optical system embodying the present invention.

Fig. 5 is a corresponding section in the horizontal plane.

Fig. 6 is an enlarged elevation of a portion of the optical system of Figs. 4 and 5 showing the light spot of vertically varying illumination which is formed therein in the plane of the positive film.

Figure 7:
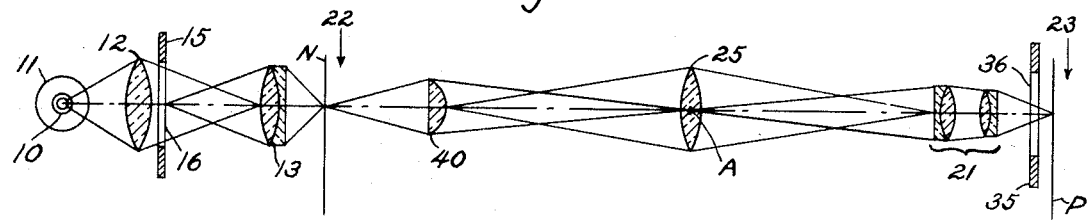
Figs. 7 and 8 are diagrammatic longitudinal sections in the vertical and horizontal planes, respectively, of another embodiment of the invention.

In order better to explain the novel features and principle of operation of the erect image conversion sound printing optical system according to the present invention, there is shown in Figs. 1 to 3 by way of example a conventional erect image sound printing optical system. Since all the lenses employed therein are spherical, a section in only the vertical plane is shown in Fig. 1, it being understood that a section in the horizontal plane would, in all the essentials, be identical with the section in the vertical plane.

The sound printing optical system of Figs. 1 to 3 has the following arrangement for uniformly illuminating that area of the variable area sound track S on the negative film N (Fig. 3) which is to be printed at any given instant of the printing operation. An appropriate light source such as the filament 10 of an incandescent lamp 11 is imaged by a spherical condenser 12 substantially at the spherical lens 13, which is illustrated by way of example as a simple achromat. A screen 15 with a rectangular opening 16 (Fig. 2) is placed between lamp 11 and spherical lens 13, and an image of opening 16 is formed by spherical lens 13 in the plane of the negative film N. By the action of spherical condenser 12, which may be placed on either side of screen 15, opening 16 is uniformly illuminated and, since lens 13 is spherical and hence acts in both the vertical and horizontal planes, the image formed thereby of the uniformly illuminated opening 16 is a uniformly illuminated rectangular light spot 17 (Fig. 3). Thus, a uniformly illuminated rectangular area is provided in the plane of film N, which area is on the variable area sound track S when film N moves through this plane. For that reason, the uniformly illuminated area in the plane of film N, or light spot 17, is more or less obscured by the opaque portion of sound track S.

Two compound objectives 20 and 21, respectively, both spherical and preferably well corrected for spherical and chromatic aberration and coma, are provided between the plane of the negative film N and the plane of the positive film P, on which film the sound track S is to be printed. Objective 20 forms at a point A intermediate the two film planes an enlarged image of light spot 17, and objective 21 forms in the plane of the positive film P a reduced image of the image of light spot 17 formed at point A, the reduction by objective 21 being of the same order as the enlargement by objective 20. Since objective 20 and objective 21 are spherical and hence act in both the vertical and horizontal planes, the images of the uniformly illuminated rectangular light spot 17 formed thereby at point A and in the plane of film P, respectively, are also uniformly illuminated rectangular light spots obscured, however, to the same extent as light spot 17 is obscured by the opaque portion of sound track S. Due to the usual inversion produced when real images are formed by simple positive lens systems such as objectives 20 and 21, the co-ordinate directions of light spot 17 are inverted in the image thereof formed at point A, and the directions of this image are again inverted in the image formed in the plane of film P, thus permitting movement of the films N and P in the same direction, as indicated by the arrows 22 and 23.

In order to insure efficient light utilization, a spherical field, or collecting, lens 25 is positioned between objectives 20 and 21 so that point A is within lens 25. Spherical lens 25 images objective 20 substantially at objective 21, thus concentrating the light flux proceeding through the optical system into objective 21. Spherical lens 25 has no effect upon the imagery at point A of light spot 17 by objective 20 since the image of light spot 17 falls within lens 25. For the same reason, lens 25 has no effect upon the imagery in the plane of film P of the image at point A by objective 21.

It will thus be seen that with the conventional sound printing optical system of Figs. 1 to 3, the image formed in the plane of the positive film P is a replica of the illuminated area of the sound track on the negative film N as regards not only the amount but also the distribution of its illumination. When, therefore, the sound track on the negative film N is of the variable area type as is sound track S shown by way of example in Fig. 3, the sound track produced on the positive film P is also of the variable area type. When, on the other hand, the sound track on film N is of the variable density type, the sound track produced on film P is also of the variable density type.

Referring now to Figs. 4 to 6, there is shown, by way of example, an embodiment of the erect image conversion sound printing optical system according to the present invention. It will easily be seen that the optical system of Figs. 4 to 6 is identical with the conventional optical system illustrated in Figs. 1 to 3 except for the fact that the spherical objective 21 of the latter has been replaced in the former by a cylindrical lens 30 having its cylinder axis horizontal and hence acting in only the vertical plane. Up to point A, therefore, the imagery performed in the optical system of Figs. 4 to 6 is identical with the imagery performed in the optical system of Figs. 1 to 3 as explained hereinabove. That is to say, in the optical system of Figs. 4 to 6, too, there is formed at point A a uniformly illuminated rectangular light spot which is obscured in the same manner as the light spot 17 formed in the plane of film N is obscured by the opaque portion of the variable area sound track S. The light spot formed at point A may therefore be considered as being composed of a large number of very small horizontal levels of light which are equal in vertical extension, or height, but vary in horizontal extension, or length, in accordance with the variation in horizontal extension, or width, of the transparent portion of the area on sound track S illuminated by light spot 17. The illumination of these horizontal levels is uniform, that is, the amount of light flux per unit area is equal in each individual level as well as in any one level as compared with any other level, the shorter levels thus containing a smaller amount of light flux than the longer ones.

Since cylindrical lens 30 does not act in the horizontal plane, the light fluxes which emanate from the individual horizontal levels of the light spot at point A, diverge in the horizontal plane (Fig. 5). Since, on the other hand, cylindrical lens 30, by its action in the vertical plane, focuses these light fluxes in the plane of film P by forming therein an image of the light spot at point A (Fig. 4), their divergence is restricted to a horizontal direction, and for each horizontal level of the light spot at point A there is formed a corresponding horizontal level in the plane of film P. Since, furthermore, the angle of divergence is about equal for all the horizontal levels irrespective of their difference in length, the horizontally diverging light fluxes arrive at the plane of film P spread out over about equal lengths so that the horizontal levels in the plane of film P are of about equal length. Since, finally, the shorter horizontal levels of the light spot at point A contain a smaller amount of light flux than the longer ones, the horizontal levels in the plane of film P corresponding to the shorter levels at point A have less illumination than those corresponding to the longer ones.

Thus, by virtue of the fact that the light spot at point A is imaged in the plane of film P by a lens acting in only the vertical plane (cylindrical lens 30) and that, furthermore, there is no other lens provided in the optical system which acts in the horizontal plane and images the light spot at point A in the plane of film P, there is formed in the plane of film P a light spot 31 whose illumination varies vertically (Fig. 6), and the amount of light flux contained in each horizontal level of light spot 31 is the same as was contained in the corresponding horizontal level of the light spot at point A. The variation in illumination of the horizontal levels of light spot 31, therefore, is directly and linearly proportional to the variation in length of the horizontal levels of the light spot at point A.

It has been pointed out hereinbefore that the horizontally diverging light fluxes arrive at the plane of film P spread out over about equal lengths thus forming in the plane of film P horizontal levels of about equal length. Within each of these horizontal levels, however, the light flux is evenly distributed only over its central portion, while at its ends the amount of light flux per unit area decreases. The edges, therefore, of light spot 31 are blurred as indicated at 32 and 33 in Fig. 6, and hence would cause distortion if they were reproduced on film P. For that reason, a screen 35 with a rectangular opening 36, or like apertured masking means, is placed in front of the plane of film P, opening 36 being so dimensioned that the blurred edges 32 and 33 of light spot 31 are intercepted by screen 35 and only the central portion of light spot 31 is permitted to pass through opening 36 and to fall on film P (Fig. 6). Thus, the reproduction of the blurred edges 32 and 33 on film P is prevented.

Simultaneously, apertured screen 35 shields film P from being exposed to any stray light which might arise in the optical system, to which end it is customarily provided in projection sound printing optical systems (see Fig. 1).

In the optical system of Figs. 4 to 6, like in that of Figs. 1 to 3, the co-ordinate directions of light spot 17 are inverted in the image thereof at point A. The vertical directions of this image are then inverted again in the light spot 31 while, since cylindrical lens 30 does not act in the horizontal plane, no inversion takes place with respect to the horizontal directions of the image at point A. This, however, is immaterial since films N and P move, as indicated in Fig. 4 by the arrows 22 and 23, in the same direction vertically, that is, in the direction in which inversion is effected by cylindrical lens 30.

The spherical field lens 25 is again provided to insure efficient light utilization. It is again positioned so that point A falls therewithin, and it images objective 20 substantially at cylindrical lens 30 while, for the reasons stated hereinabove, it does not interfere with the imagery of either light spot 17 at point A or the image at point A in the plane of film P.

It will thus be seen that with the erect image sound printing optical system of Figs. 4 to 6, the image formed in the plane of the positive film P corresponds to the illuminated area of the sound track on the negative film N only as regards the vertical variation of its illumination, which is distributed horizontally over the entire image in the plane of film P no matter over which fraction of the illuminated area of the sound track it is distributed horizontally. If, therefore, the sound track on the negative film N is of the variable area type as is sound track S shown by way of example in Fig. 3, there appears on the positive film P a sound track 38 (Fig. 6) which is of the variable density type but has otherwise the same characteristics as the variable area sound track S on film N. If, on the other hand, the sound track on film N is of the variable density type, there appears on film P also a sound track of the variable density type.

Figure 8:
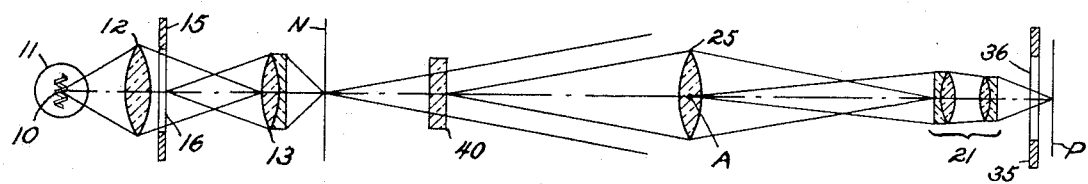
Figure 9:
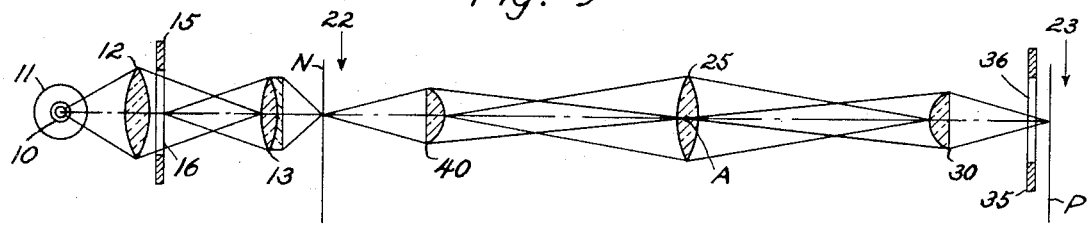
Figs. 9 and 10 are diagrammatic longitudinal sections in the vertical and horizontal planes, respectively, of still another embodiment of the invention.
Figure 10:
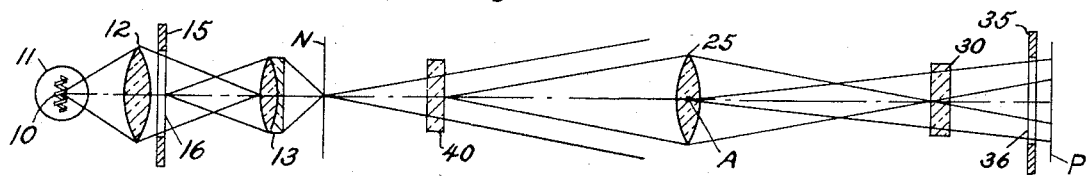

In the embodiment of the invention shown in Figs. 4 to 6, the light spot 31 of vertically varying illumination is formed immediately in the plane of film P. However, light spot 31 may also be formed at any position intermediate the planes of films N and P which permits of its suitably being imaged in the plane of film P. For example, light spot 31 may conveniently be formed at point A by replacing objective 20 by a cylindrical lens 40 with its cylinder axis horizontal in either the optical system of Fig. 1 as shown in Figs. 7 and 8, or the optical system of Figs. 4 and 5 as shown in Figs. 9 and 10, light spot 31 being imaged in the plane of film P by objective 21 in the case of Figs. 7 and 8 and by cylindrical lens 30 in the case of Figs. 9 and 10. With the imagery performed at point A by cylindrical lens 40 of the uniformly illuminated light spot 17 formed in the plane of film N and more or less obscured by the opaque portion of the sound track S on film N, there is obtained in either case the same result as is obtained with the imagery performed in the plane of film P by cylindrical lens 30 of the image of light spot 17 formed at point A by objective 20. This is to say, by virtue of the fact that light spot 17 as obscured by sound track S is imaged at point A by a lens acting in only the vertical plane and that, furthermore, there is no other lens provided in the optical system which acts in the horizontal plane and images light spot 17 at point A, there is, in the optical system of Figs. 7 and 8 as well as in that of Figs. 9 and 10, formed at point A the light spot 31 of vertically varying illumination which is formed immediately in the plane of film P in the optical system of Figs. 4 and 5.

Light spot 31 when formed at point A has the same general appearance as when it is formed in the plane of film P. It again has a central portion over which the light flux is evenly distributed horizontally, while its edges again are blurred as indicated at 32 and 33 in Fig. 6. Blurred edges 32 and 33 would be reproduced in the image of light spot 31 which is formed in the plane of film P by objective 21 in the optical system of Figs. 7 and 8 and by cylindrical lens 30 in the optical system of Figs. 9 and 10, respectively, if they were not intercepted by apertured screen 35 which is again placed in front of the plane of film P.

Regarding the imagery of light spot 31 in the plane of film P by either objective 21 or cylindrical lens 30, little need be said in addition to the explanations made hereinabove. Since the central portion of light spot 31 is evenly illuminated horizontally, the imagery of light spot 31 may well be performed by imaging means acting in both the vertical and horizontal planes such as the spherical objective 21 of the optical system of Figs. 7 and 8. Since, on the other hand, no imaging action in the horizontal plane is required to reproduce a light spot whose illumination varies in only a vertical direction, the imagery of light spot 31 may also be performed by imaging means acting in only the vertical plane such as the cylindrical lens 30 of the optical system of Figs. 9 and 10.

Inversion, and re-inversion, of the vertical directions of light spot 17 takes place by the successive imaging actions in the vertical plane of cylindrical lens 40 and objective 21 in the optical system of Figs. 7 and 8, and of cylindrical lenses 40 and 30 in the optical system of Figs. 9 and 10. This enables vertical movement of films N and P in the same direction as indicated in Figs. 7 and 9 by the arrows 22 and 23.

The spherical field lens 25 performs the same function as in the optical system of Figs. 4 and 5 by imaging cylindrical lens 40 substantially at either objective 21 in the optical system of Figs. 7 and 8, or cylindrical lens 30 in the optical system of Figs. 9 and 10.

It will thus be seen that with the erect image sound printing optical systems of Figs. 7 and 8, and Figs. 9 and 10, conversion of a variable area sound track on the negative film N into a variable density sound track on the positive film P may be effected in substantially the same manner as with the optical system of Figs. 4 and 5. Like the latter optical system, however, the two former optical systems may also be employed when variable density prints are to be made from variable density negatives.

In each of the sound printing optical systems of Figs. 4 and 5, Figs. 7 and 8, and Figs. 9 and 10, there are provided an incandescent lamp filament 10, a spherical condenser 12, a screen 15 with a rectangular opening 16, and a spherical lens 13, condenser 12 imaging filament 10 through opening 16 substantially at lens 13 and lens 13 imaging opening 16 in the plane of the negative film N. This arrangement is a conventional way of providing, in sound printing optical systems, means for uniformly illuminating an area in the plane of the negative film, and it has been shown and described as part of the optical systems according to the present invention by way of example only. There are a number of other ways of providing for a uniformly illuminated area in the plane of the negative film, which are equally well suited for the optical systems of the invention. One such way, for example, consists in omitting screen 15 with opening 16 and lens 13 and forming the image of lamp filament 10 by means of the spherical condenser 12 substantially at either objective 20 in the optical system of Figs. 4 and 5 or cylindrical lens 40 in the optical systems of Figs. 7 and 8 and Figs. 9 and 10. The resulting arrangement is shown, by way of example, in Figs. 11 and 12 for the optical system of Figs. 4 and 5 and in Figs. 13 and 14 for the optical system of Figs. 7 and 8, and by virtue thereof an area in the plane of film N is so illuminated that its central portion is again a uniformly illuminated light spot such as light spot 17 illustrated in Fig. 3. Since this uniformly illuminated area, or light spot, is on the variable area sound track S when film N moves through its plane, it is again more or less obscured by the opaque portion of sound track S.

On account of the omission of screen 15 with opening 16 or, more specifically, of the image of opening 16 formed by spherical lens 13, the uniformly illuminated light spot in the plane of film N may in the case explained in the preceding paragraph not always be restricted vertically and horizontally to the degree required for obtaining an image in the plane of film P which has suitable vertical and horizontal dimensions. This situation, which is immaterial as far as the particular imagery disclosed in the present specification is concerned, may be remedied in a number of ways as will easily be understood by those skilled in the art. For example, screen 15 with opening 16 may again restrict the two co-ordinate dimensions of the uniformly illuminated light spot in the plane of film N by being placed adjacent to this plane. Alternatively, screen 15 may be placed adjacent to the field lens so as suitably to restrict the dimensions of the image formed at point A by either objective 20 or cylindrical lens 40, as shown by way of example in Figs. 11 and 12 for the optical system of Figs. 4 and 5. A third alternative is to place screen 15 in front of the plane of film P so as to restrict to suitable dimensions the image formed therein by either objective 21 or cylindrical lens 30, as shown by way of example in Figs. 13 and 14 for the optical system of Figs. 7 and 8. Figs. 13 and 14 show a further modification which will be explained presently.

Figure 11:
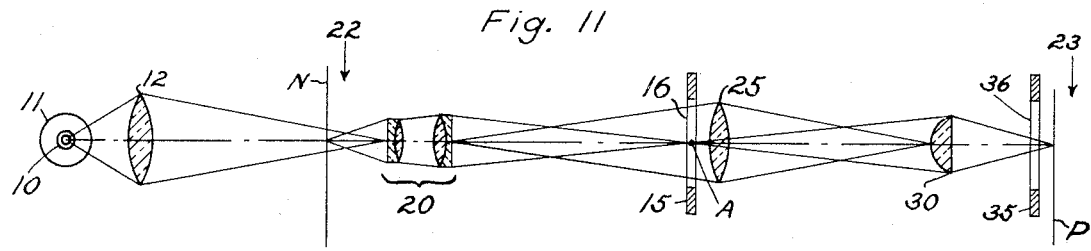
Figs. 11 and 12 are diagrammatic longitudinal sections in the vertical and horizontal planes, respectively, showing a modification as applied to the optical system of Figs. 4 and 5.
Figure 12:
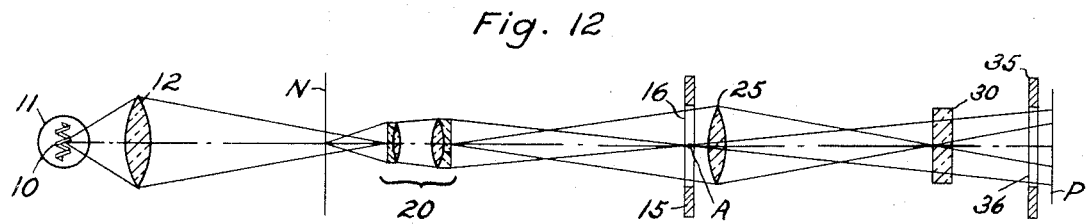
Figure 13:
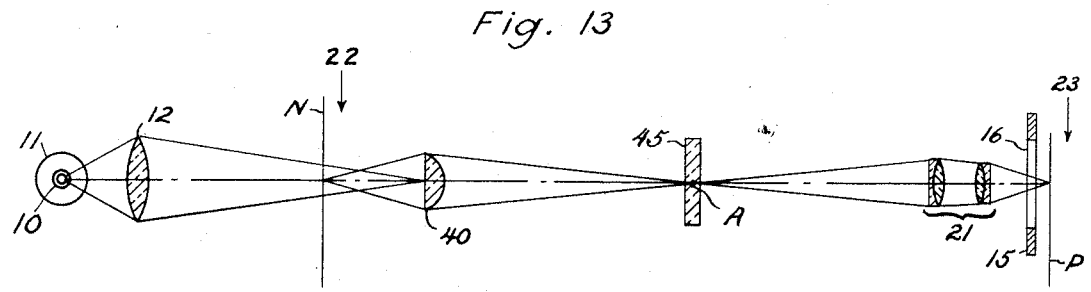
Figs. 13 and 14 are diagrammatic longitudinal sections in the vertical and horizontal planes, respectively, showing further modifications as applied to the optical system of Figs. 7 and 8.
Figure 14:
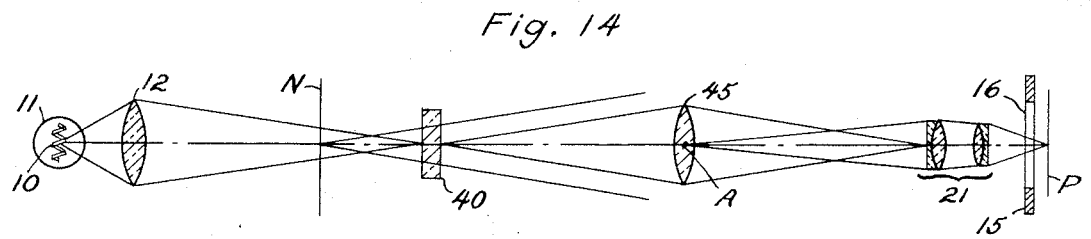

It should be noted that, whenever the arrangement shown in Figs. 11 to 14 for uniformly illuminating an area in the plane of film N is employed with any one of the optical systems of Figs. 4 and 5, Figs. 7 and 8, and Figs. 9 and 10, screen 15 may be placed in any of the three cases either adjacent to the plane of film N, or adjacent to the field lens as illustrated in Figs. 11 and 12, or in front of the plane of film P as illustrated in Figs. 13 and 14. Furthermore, placed in front of the plane of film P, screen 15 performs also the functions of apertured screen 35 which therefore becomes superfluous and hence may be omitted in this case (see Figs. 13 and 14). When, on the other hand, screen 15 is placed adjacent to the plane of film N, in which case it may be placed on either side of this plane, or adjacent to the field lens, in which case it may be placed on either side of the field lens, the employment of apertured screen 35 is generally desirable for the reasons stated hereinabove in connection with the description of Figs. 4 and 5.

When used adjacent to the field lens, screen 15 is preferably placed so that point A is within rectangular opening 16 and not within the field lens as shown and described hereinbefore, the field lens being then placed only approximately at point A. This condition is illustrated in Figs. 11 and 12. It facilitates adjustment of the optical systems in that screen 15 provides a convenient target on which objective 20 and cylindrical lens 40, respectively, may be so focused as to form in the plane of opening 16 the image of the uniformly illuminated light spot, the plane of opening 16 being at right angles to both the vertical and horizontal planes and hence parallel to the planes of films N and P.

The placing of the field lens only approximately at point A is permissible because it performs its function to concentrate the light flux proceeding through the optical system into either objective 21 or cylindrical lens 30 when it is placed in the approximate neighborhood of point A as well as when it is placed exactly at point A. The field lens may therefore be placed approximately at point A not only in the particular case illustrated in Figs. 11 and 12 but in any embodiment of the optical systems of the present invention. Because of its merely light gathering or concentrating function it is furthermore sufficient that the field lens forms an image of objective 20 and cylindrical lens 40, respectively, merely substantially at cylindrical lens 30 and objective 21, respectively, that is, in the general neighborhood of the last mentioned two lenses. Care, however, must be taken in any embodiment of the present invention that the field lens, either alone or in conjunction with other lenses acting in the horizontal plane, does not image in the plane of film P the uniformly illuminated light spot formed in the plane of film N.

A freedom similar to that which exists for the choice of the conjugate foci of the field lens, exists for the choice of the conjugate foci of spherical condenser 12. Condenser 12 performs its function uniformly to illuminate opening 16 in the case illustrated in Figs. 4 and 5 and 7 to 10 when it forms the image of lamp filament 10 substantially at spherical lens 13, that is, either on that lens as shown in the drawing, or in the general neighborhood thereof. Likewise, condenser 12 performs its function uniformly to illuminate an area in the plane of film N in the case illustrated in Figs. 11 to 14 when it forms an image of lamp filament 10 substantially at objective 20 and cylindrical lens 40, respectively, that is, either on those lenses or in the general neighborhood thereof. On the other hand, the imaging means performing the imagery between the plane of film N and point A and those performing the imagery between point A and the plane of film P must have at their conjugate foci the particular objects and places of imagery associated therewith. That is to say, objective 20 and cylindrical lens 40 must have at their conjugate foci the uniformly illuminated area, or light spot, in the plane of film N and point A, respectively, and objective 21 and cylindrical lens 30 must have at their conjugate foci point A and the plane of film P, respectively. Finally, when spherical lens 13 is employed, it should preferably have at its conjugate foci opening 16 and the plane of film N, respectively.

The field lens has been shown and described hereinabove as being a spherical lens and hence acting in both the vertical and horizontal planes. The field lens, however, performs its light gathering function also when it acts in only the horizontal plane. In any embodiment of the present invention, therefore, there may be employed as the field lens either a spherical lens such as lens 25 shown by way of example in Figs. 4 and 5 and 7 to 12, or a cylindrical lens with its cylinder axis vertical such as lens 45 shown by way of example in Figs. 13 and 14. All that has been set forth hereinabove with respect to spherical lens 25, or a field lens in general, is equally valid for a cylindrical lens with its cylinder axis vertical when employed as the field lens in the optical systems of the invention.

In the optical systems which have been shown in Figs. 4 and 5 and 7 to 14 and described hereinabove as examples of the present invention, the two imaging means performing the imagery and re-imagery, respectively, of the uniformly illuminated area, or light spot, in the plane of film N—that is, in the examples illustrated, either objective 20 and cylindrical lens 30, or cylindrical lens 40 and objective 21, or cylindrical lenses 40 and 30—both have the same power in the vertical plane for performing their respective imaging actions. Intermediate point A is therefore approximately halfway between the planes of films N and P in these cases, and the sound track on the negative film N is reproduced on the positive film P with a ratio of imagery of one to one in the vertical plane, that is, the variable density sound track produced on film P has the same vertical extension, or height, as the variable area or variable density sound track on film N. However, the objects of the invention, and particularly the conversion of a variable area sound track into a variable density sound track by printing, are also accomplished when different powers are given to the two above mentioned imaging means so that intermediate point A is closer to either the plane of film P or the plane of film N and the sound track produced on film P is of either reduced or enlarged height.

No corresponding ratios of imagery exist in the horizontal plane since in this plane film N and film P are out of focus with respect to each other in any embodiment of the invention. The horizontal extension, or width, of the variable density sound track produced on film P depends therefore upon the size of the angle at which the light flux diverges in the horizontal plane from either point A (see Figs. 5 and 12), or the plane of film N (see Figs. 8 and 14), or both (see Fig. 10). This angle is determined by the design given in any actual embodiment of the invention to the particular arrangement employed therewith for uniformly illuminating an area in the plane of film N, as will readily be understood by those skilled in the art, and the larger the angle is made, the wider a sound track is obtained on film P, and vice versa.

The determination of the width of the variable density sound track produced on film P by the size of the angle of divergence in the horizontal plane, and the determination of its height by the power of the two imaging means in the vertical plane are entirely independent of each other. The variable density sound track on film P may therefore have the same height and width as the sound track on film N, or it may have the same height and either a reduced or an enlarged width, or it may have the same width and either a reduced or an enlarged height, or both its height and width may be either reduced or enlarged, or its height may be reduced and its width enlarged or vice versa. In all the cases in which the ratio of magnification is different heightwise and widthwise, no cylindrical or other anamorphoser need be provided since the divergence in the horizontal plane which takes place at at least one point along the optical axis of any optical system embodying the invention, amounts to complete anamorphosis in that plane. This is an additional advantage over the conventional optical systems of the type illustrated in Fig. 1, in which anamorphosers must be provided if they are to operate efficiently with different ratios of magnification in the two co-ordinate directions.

The conversion, by means of the optical systems of the invention, of a variable area sound track into a variable density sound track has been explained hereinabove with reference to the variable area sound track S which is shown in Fig. 3 as being of the unilateral type. However, by means of these optical systems there may also be converted into a variable density sound track a variable area sound track of the bilateral, or symmetrical, type. An original negative of a symmetrical variable area sound track ordinarily has its transparent portion divided in two by its centrally disposed opaque portion. Thus, the uniformly illuminated light spot which is more or less obscured by the opaque portion of the variable area sound track, is composed in this case of horizontal levels of light consisting each of two illuminated sections which are separated by a dark section. But the symmetrical variable area sound track will nevertheless be converted into a single variable density sound track since, as has been explained hereinabove in connection with Figs. 4 and 5, the angle of divergence is about equal for all points of an individual horizontal level as well as for all horizontal levels, their difference in length notwithstanding. For the same reason, there may also be converted into a single variable density sound track by means of the optical systems of the invention a multiple variable area sound track, that is, a variable area sound track which is composed of a plurality of either unilateral or bilateral tracks.

The two arrangements shown in Figs. 4 and 5 and 7 to 10, and in Figs. 11 to 14, respectively, form in the plane of film N an area, or light spot, whose illumination is uniform in the two co-ordinate directions. That is to say, the light flux contained in this light spot is distributed over its whole area uniformly in the vertical as well as in the horizontal direction. Such uniform distribution of the light flux, however, is merely a matter of convenience in designing an optical system embodying the present invention, and not a prerequisite for operating it successfully. To that end, the light spot formed in the plane of film N and, in the case illustrated in Figs. 4 and 5 and 11 and 12, also at point A, need have a uniform distribution of light flux in only the horizontal direction. Whenever, therefore, it is desired to effect, in this light spot, a distribution of light flux which is non-uniform in the vertical direction, for example, by placing a screen of vertically varying transparency adjacent to the plane of film N, this may be done in any embodiment of the invention without impairing its operativeness. It will furthermore be understood that the terms "uniformly illuminated area," "uniformly illuminated light spot," "means for uniformly illuminating an area," and similar terms, as used throughout this description and in the appended claims, refer to an illuminated area, or light spot, whose illumination is uniform in at least the horizontal direction.

What is claimed is:

1. In an optical system for printing on a positive film from a negative film having a sound track thereon, the combination of a first plane through which said negative film may move vertically, a second plane through which said positive film may move vertically and in the same direction as said negative film, means for uniformly illuminating an area in said first plane, said area being on said sound track when said negative film moves through said first plane, first imaging means acting in only the vertical plane and forming an image of said illuminated area at a point intermediate said first and second planes, second imaging means acting in only the vertical plane and imaging said image in said second plane, and third imaging means acting in the horizontal plane and imaging said first imaging means substantially at said second imaging means so as to concentrate the light flux proceeding through said optical system into said second imaging means; said first imaging means being the only imaging means having at its conjugate foci said illuminated area and said intermediate point, said second imaging means being the only imaging means having at its conjugate foci said image and said second plane, and said third imaging means being placed approximately at said intermediate point.

2. In an optical system for printing on a positive film from a negative film having a sound track thereon, the combination of a first plane through which said negative film may move vertically, a second plane through which said positive film may move vertically and in the same direction as said negative film, means for uniformly illuminating an area in said first plane, said area being on said sound track when said negative film moves through said first plane, a first cylindrical lens having its cylinder axis horizontal and forming an image of said illuminated area at a point intermediate said first and second planes, a second cylindrical lens having its cylinder axis horizontal and imaging said image in said second plane, and a spherical lens placed approximately at said intermediate point and imaging said first cylindrical lens substantially at said second cylindrical lens so as to concentrate the light flux proceeding through said optical system into said second cylindrical lens; said first cylindrical lens being the only imaging means having at its conjugate foci said illuminated area and said intermediate point, and said second cylindrical lens being the only imaging means having at its conjugate foci said image and said second plane.

JOHN A. MAURER, Jr.